US008997365B2

(12) United States Patent
Alexander et al.

(10) Patent No.: US 8,997,365 B2
(45) Date of Patent: Apr. 7, 2015

(54) SHAFT ALIGNMENT TOOLS AND METHODS

(75) Inventors: Sean J. Alexander, San Diego, CA (US); Ronald K. Johnston, El Cajon, CA (US)

(73) Assignee: Solar Turbines Incorporated, San Diego, CA (US)

( * ) Notice: Subject to any disclaimer, the term of this patent is extended or adjusted under 35 U.S.C. 154(b) by 282 days.

(21) Appl. No.: 13/494,610

(22) Filed: Jun. 12, 2012

(65) Prior Publication Data

US 2013/0326891 A1 Dec. 12, 2013

(51) Int. Cl.
*G01D 21/00* (2006.01)
*G01B 11/14* (2006.01)
*G01B 5/25* (2006.01)

(52) U.S. Cl.
CPC .......................... *G01B 5/25* (2013.01)

(58) Field of Classification Search
CPC .......... G01B 5/25; G01B 11/272; G01B 5/14; G01B 5/24; B25D 5/02
USPC .................... 33/412, 529, 613, 645
See application file for complete search history.

(56) References Cited

U.S. PATENT DOCUMENTS

| | | | | |
|---|---|---|---|---|
| 3,664,029 A * | 5/1972 | Glucoft et al. | ................... | 33/572 |
| 4,115,925 A * | 9/1978 | Malak | ............................. | 33/661 |
| 4,161,068 A * | 7/1979 | McMaster | ...................... | 33/412 |
| 4,214,457 A | 7/1980 | Wade et al. | | |
| 4,439,925 A | 4/1984 | Lock | | |
| 4,516,328 A * | 5/1985 | Massey | ............................ | 33/645 |
| 4,518,855 A * | 5/1985 | Malak | ......................... | 356/141.3 |
| 4,553,335 A * | 11/1985 | Woyton | ........................... | 33/645 |
| 4,586,264 A * | 5/1986 | Zatezalo | ......................... | 33/412 |
| 4,709,485 A * | 12/1987 | Bowman | ......................... | 33/228 |
| 4,928,401 A * | 5/1990 | Murray, Jr. | ....................... | 33/645 |
| 4,964,224 A * | 10/1990 | Jackson | ........................... | 33/645 |
| 5,056,237 A * | 10/1991 | Saunders | ........................ | 33/645 |
| 5,185,937 A * | 2/1993 | Piety et al. | ....................... | 33/645 |
| 5,222,306 A | 6/1993 | Neumann | | |
| 5,371,953 A * | 12/1994 | Nower et al. | ................... | 33/645 |
| 5,435,073 A * | 7/1995 | Sullivan | ........................... | 33/661 |
| 5,479,718 A * | 1/1996 | Cook | ............................... | 33/412 |
| 5,514,952 A * | 5/1996 | Parkinson | ....................... | 33/661 |
| 5,980,094 A * | 11/1999 | Nower | ............................ | 33/613 |
| 6,883,224 B2 | 4/2005 | Thomas | | |
| 7,798,012 B2 * | 9/2010 | Rosen et al. | .................... | 73/781 |
| 7,891,104 B2 * | 2/2011 | Muellner | ........................ | 33/412 |
| 8,533,965 B2 * | 9/2013 | Stromberg | ....................... | 33/412 |
| 8,689,455 B2 * | 4/2014 | Smith et al. | ..................... | 33/412 |
| 2010/0226770 A1 | 9/2010 | Frick et al. | | |
| 2013/0326890 A1 * | 12/2013 | Alexander et al. | .............. | 33/228 |
| 2013/0326891 A1 * | 12/2013 | Alexander et al. | .............. | 33/228 |
| 2014/0250916 A1 * | 9/2014 | Cabeen et al. | .................. | 60/797 |

FOREIGN PATENT DOCUMENTS

RU   2006 100 793 A   1/2006

OTHER PUBLICATIONS

Specification of U.S. Appl. No. 13/494,577, filed Jun. 12, 2012 (26 pages).

* cited by examiner

*Primary Examiner* — Yaritza Guadalupe-McCall
(74) *Attorney, Agent, or Firm* — Finnegan, Henderson, Farabow, Garrett & Dunner, LLP

(57) ABSTRACT

The present disclosure is directed to a shaft alignment tool including a base, a rotational body mounted on the base for relative rotation with respect to the base, and an alignment meter coupled to the rotational body.

20 Claims, 7 Drawing Sheets

FIG. 2

SHAFT ALIGNMENT TOOLS AND METHODS

TECHNICAL FIELD

The present disclosure relates generally to a shaft alignment, and more particularly to shaft alignment tools and methods.

BACKGROUND

Shaft alignment is an important procedure to ensure proper operation of mechanical systems including rotational components. For example, a turbine engine system requires shaft alignment between a turbine engine and a gearbox, before they are coupled to provide power transmission. The alignment between shafts generally includes a radial alignment to ensure the rotational axes of the shafts are properly positioned with respect to each other. Existing alignment techniques involve rotating and handling of shafts themselves, which is cumbersome and dangerous and can cause damage to the shafts and components mounted thereon.

U.S. Patent Application Publication No. 2010/0226770 to Frick describes an alignment device for aligning adjacent casing sections in a gas turbine engine. The alignment device includes a fixed portion to be attached to a first turbine engine casing and a bridge portion or a cradle portion to interface with a second turbine engine casing. When installed between the first and second turbine engine casings, the bridge portion limits a relative motion between the casings. An alignment between the adjacent casings is performed by moving adjustable components of the alignment device within their range of motion. Fasteners are applied and tightened to lock the adjacent casings into place after the alignment.

SUMMARY

Embodiments of the present disclosure are directed to a shaft alignment tool including a base, a rotational body mounted on the base for relative rotation with respect to the base, and an alignment meter coupled to the rotational body.

According to another embodiment, the present disclosure provides a method of aligning a first shaft and a second shaft using a shaft alignment tool having a base and a rotational body mounted on the base for relative rotation with respect to the base. The method includes coupling the shaft alignment tool to the first shaft, aligning the shaft alignment tool with respect to the first shaft, and rotating the rotational body. The method further includes performing a radial alignment between the first shaft and a second shaft based on the rotating of the rotational body.

According to yet another embodiment, the present disclosure provides a shaft alignment tool including a base having a base shaft extending normal from a base back portion, a rotational body mounted on the base shaft for relative rotation with respect to the base, and at least one arm extending from the rotational body. The shaft alignment tool further includes an alignment meter coupled to the at least one arm.

DETAILED DESCRIPTION

Figure 1:
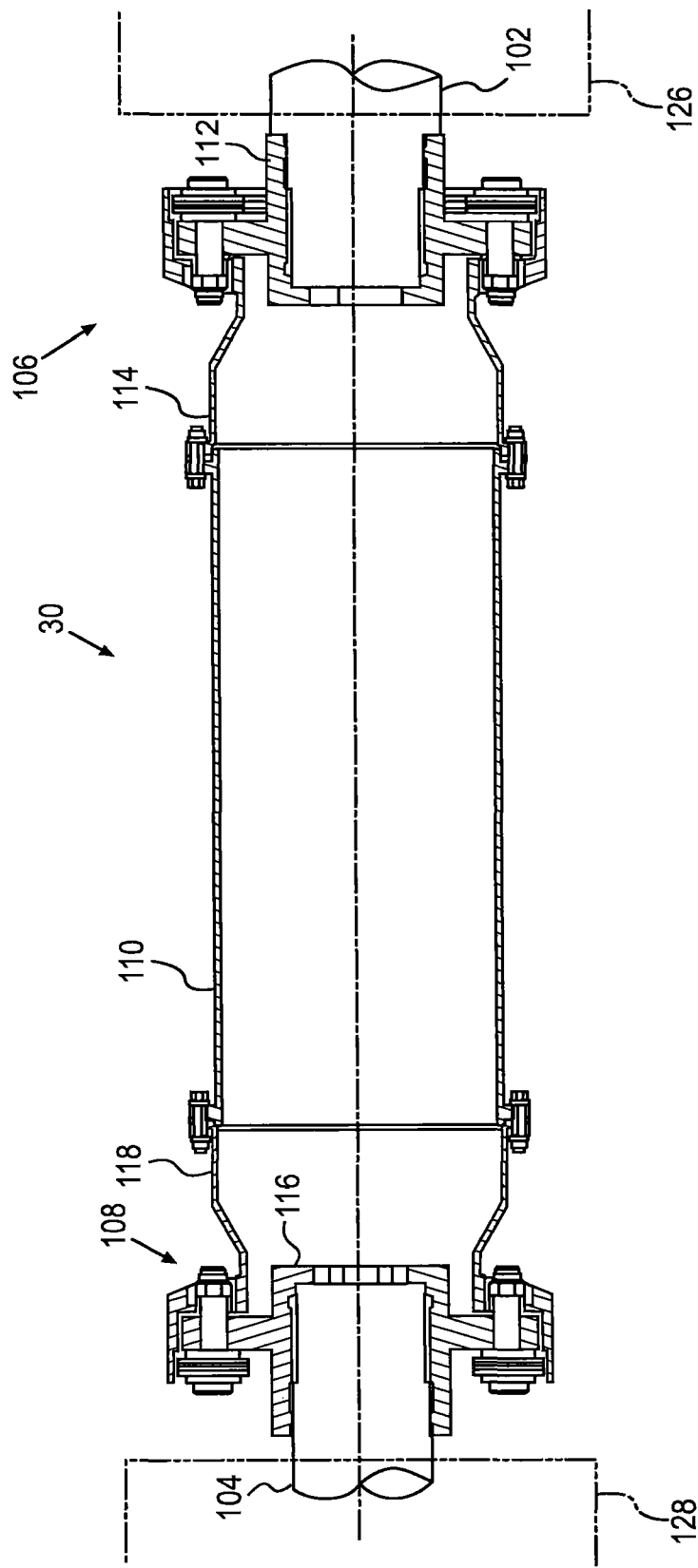
FIG. 1 is a cross-sectional view of an exemplary disclosed high-speed coupling device connecting a turbine engine output shaft and a gearbox input shaft.

FIG. 1 illustrates a high-speed coupling device 30 for connecting an input shaft 102 disposed within a gearbox housing 126 and an output shaft 104 disposed within a turbine engine housing 128. Coupling device 30 includes a first end unit 106 coupled to input shaft 102, a second end unit 108 coupled to output shaft 104, and a spacer 110 connecting first end unit 106 and second end unit 108. End unit 106 includes a shaft connector 112 and a coupling hub 114, while end unit 108 includes a shaft connector 116 and coupling hub 118. During engine operation, power and torque are transmitted from output shaft 104 to input shaft 102 through coupling device 30.

Before spacer 110 is installed to connect end units 106 and 108, shafts 102 and 104 need to be properly aligned. In particular, shafts 102 and 104 need to be aligned in the radial direction (e.g., radial alignment). Radial alignment ensures shafts 102 and 104 are positioned substantially co-axially. The radial alignment may also take into consideration heat expansion of engine components during normal operation.

FIGS. 2-5 depict exemplary disclosed alignment tools for aligning shafts 102 and 104 of FIG. 1. The alignment tools disclosed herein may be used to align shafts 102 and 104 before end units 106 and 108 are mounted to the shafts. Specifically, the alignment tool depicted in FIGS. 2 and 3 may be mounted across a bore disposed on gearbox housing 126 and/or turbine engine housing 128, while the alignment tool depicted in FIGS. 4 and 5 may be attached directly to opposite end faces of shafts 102 and 104, for aligning shafts 102 and 104.

Alternatively, the alignment tools disclosed herein may be used to align shafts 102 and 104 after end units 106 and 108 are mounted. Specifically, the alignment tool depicted in FIGS. 2 and 3 may be mounted across an opening bore of coupling hubs 114 and 118, while the alignment tool depicted in FIGS. 4 and 5 may be mounted on end faces of shaft connectors 112 and 116, for aligning shafts 102 and 104.

Figure 2:
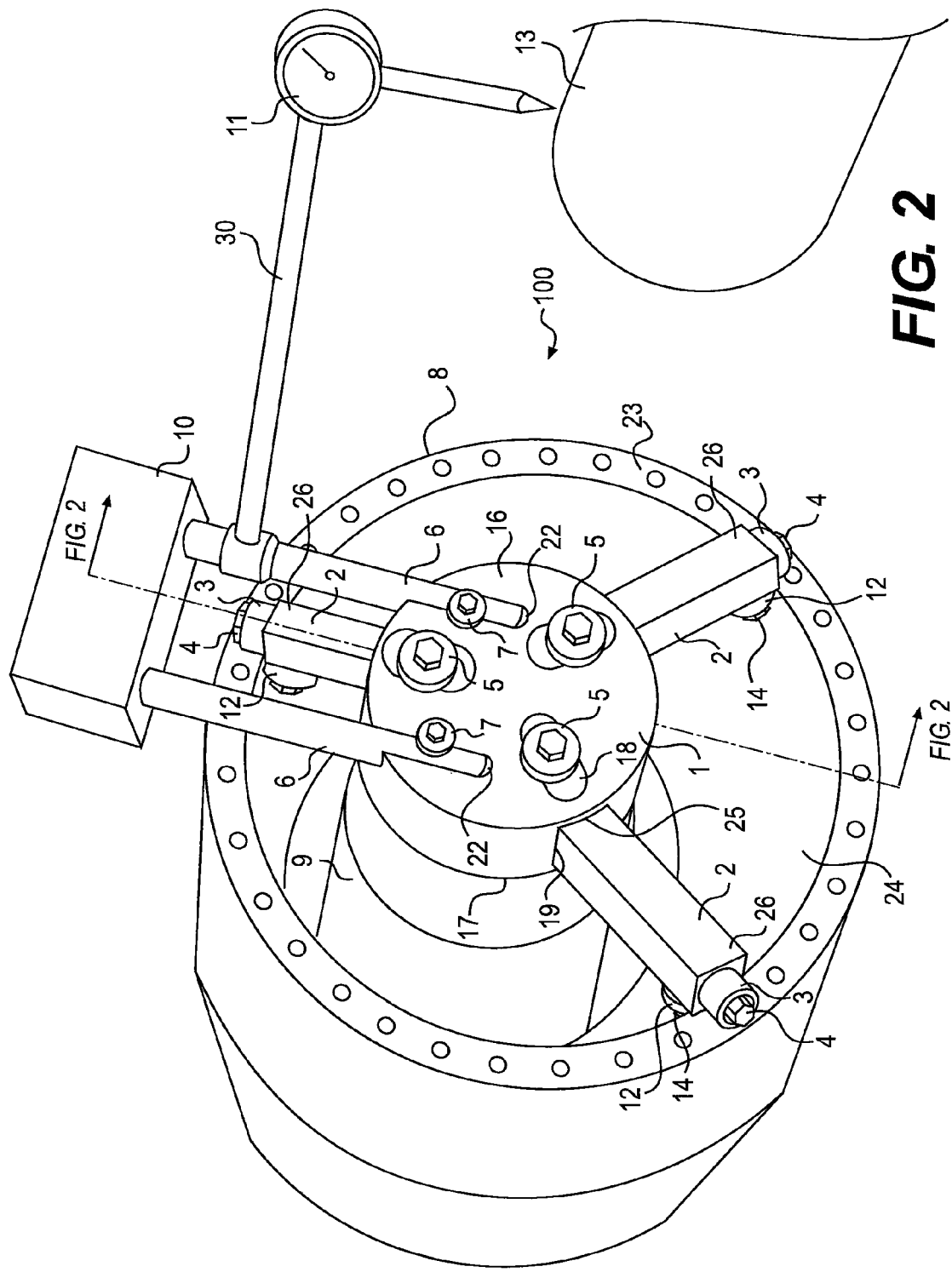
FIG. 2 is a perspective view of an exemplary shaft alignment tool.
Figure 3:
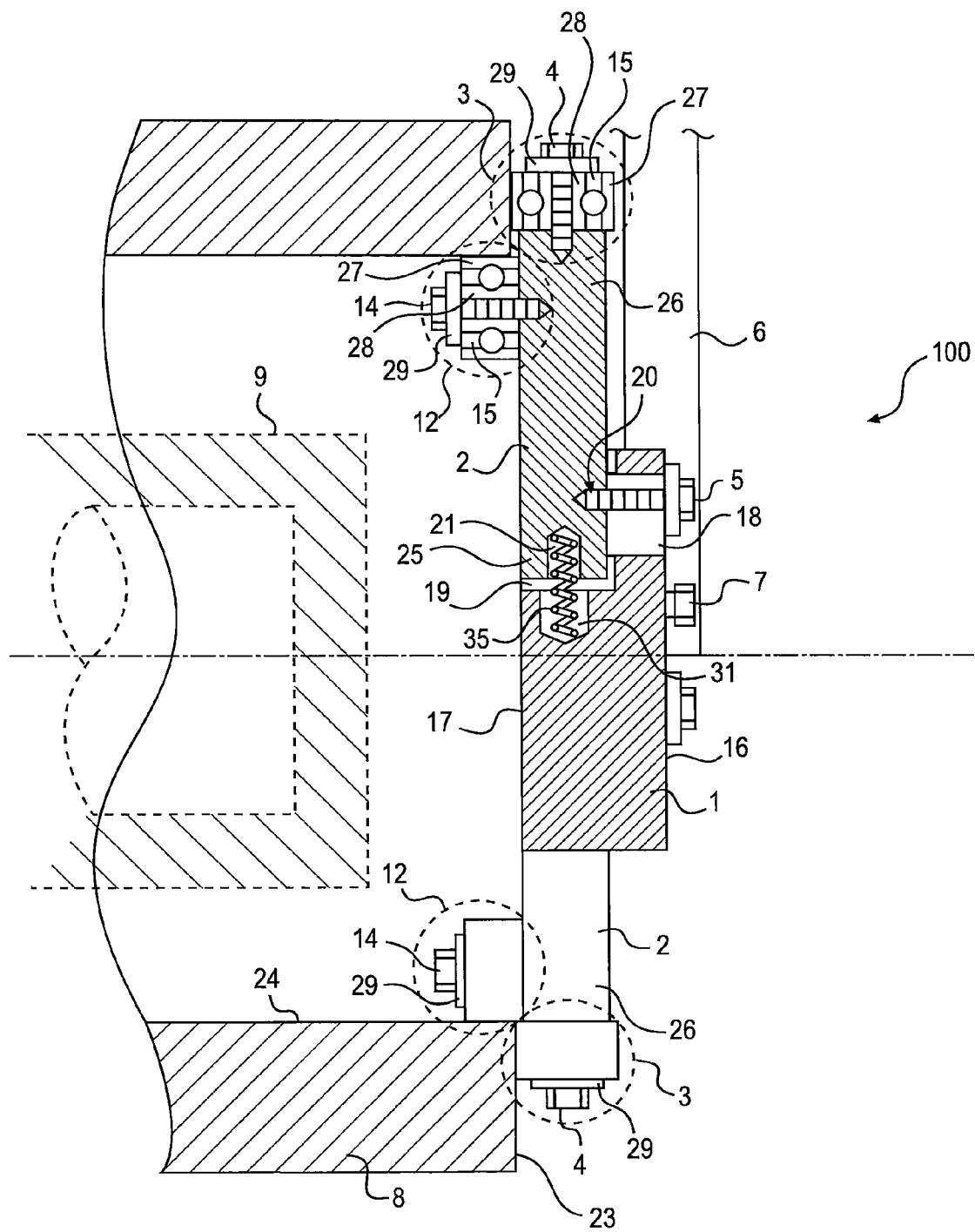
FIG. 3 is a cross-sectional view of the alignment tool of FIG. 2.

FIGS. 2 and 3 illustrates an exemplary disclosed shaft alignment tool 100 according to one embodiment. Alignment tool 100 may be used to align shaft 104 with opposite shaft 102 depicted in FIG. 1. As shown in FIG. 2, alignment tool 100 is attached to a front face 23 of shaft housing 8 across bore 24. As discussed above, alignment tool 100 may be used after end units 106 and 108 are installed on shafts 102 and 104. As such, shaft housing 8 may be part of coupling hub 114 or 118, and shaft 9 may include shaft connector 112 or 116, as shown in FIG. 1, installed thereon. Alternatively, alignment tool 100 may be used before end units 106 and 108 are installed on shafts 102 and 104. As such, shaft housing 8 may be part of housing 126 or 128, and shaft 9 may be shaft 102 or 104, as shown in FIG. 1. Still alternatively, shaft housing 8 may be a portion of a turbine engine assembly, a gear box assembly, a power generator assembly, or any other shaft housing associated with a mechanical and/or industrial system.

Alignment tool 100 includes a center hub 1 and a plurality of adjustable arms 2. Center hub 1 may have a disc shape, a cylindrical shape, a brick shape, or any other shape that is suitable to provide sufficient support for connecting adjustable arms 2. Center hub 1 has a front side 16 and a back side 17. When installed on shaft housing 8, front side 16 faces away from shaft 9, while back side 17 faces towards shaft 9. A plurality of slots 18 are formed on front side 16 of center hub 1. Each slot 18 is aligned with one of a plurality of grooves 19 formed on back side 17 of center hub 1. Grooves 19 may be formed on back side 17 of center hub 1 along a radial direction. In addition, center hub 1 has one or more grooves 22 formed on front side 16. Groove or grooves 22 may be formed along a radial direction or a lateral direction.

Each adjustable arm 2 includes an elongated body having a square or other appropriate cross section, such as a circular cross section. Each adjustable arm 2 also includes a first end section 25 inserted into groove 19 of center hub 1 and a second end section 26 extending out from center hub 1. Adjustable arm 2 can slide within groove 19. When alignment tool 100 is mounted on shaft housing 8 for performing an alignment procedure, the length of second section 26 extending out from center hub 1 can be adjusted according to a diameter of bore 24 by moving the adjustable arms 2 in or out within groove 19. For example, a large diameter of bore 24 may require urging adjustable arm 2 radially out to increase the length of second end section 26. A small diameter of bore 24 may require urging adjustable arm 2 radially in to decrease the length of the second end section 26.

Referring to FIG. 3, a screw hole 20 is formed on a side wall of first end section 25 of each adjustable arm 2. When adjustable arm 2 is positioned in groove 19, screw hole 20 on each adjustable arm 2 is aligned along slot 18 on front side 16 of center hub 1. Adjustable arm 2 is secured to center hub 1 by a bolt 5 passing through slot 18 and received by screw hole 20.

Second end section 26 of each adjustable arm 2 has a first roller assembly 3 and a second roller assembly 12 mounted thereon. First roller assembly 3 is secured by a bolt 4 to an end face of second end section 26 of adjustable arm 2, while second roller assembly 12 is secured by a bolt 14 to a back side of the body of adjustable arm 2. In one embodiment, first roller assembly 3 and second roller assembly 12 are arranged such that their rotational axes are normal to each other.

Roller assemblies 3 and 12 may have substantially similar structures. In one exemplary embodiment, each roller assembly (3 and 12) may include a bearing 15 mounted on blots 4 and 14. Bearing 15 is secured to second end section 26 of adjustable arm 2 so that an outer ring 27 of bearing 15 can rotate with respect to an inner race 28 of the bearing 15 that is stationary with respect to the adjustable arm 2. Bearing 15 may be a ball or roller bearing, or any other type of bearing. Roller assemblies 3 and 12 may also include an additional component secured about the outer diameter of outer ring 27.

A magnetic component made of a magnetic material, such as iron, nickel, magnetite, or cobalt may be included at second end section 26 of adjustable arm 2, for example, at roller assemblies 3 and/or 12. The magnetic component provides a magnetic force for attaching adjustable arms 2 onto shaft housing 8 and prevents alignment tool 100 from being easily detached during an alignment procedure. As shown in FIG. 3, in one embodiment, a magnetic component 29 may be attached to roller assemblies 3, 12 and secured by bolts 4, 14. Magnetic component 29 may be associated with both or only one of roller assemblies 3 and 12 on each adjustable arm 2, or may be separate from one or both roller assembly 3 and 12, such as being fixedly secured to a portion of the adjustable arm 2 itself Alternatively, the bearings 15 and/or bolts 4 and 14 themselves may be made of magnetic material and provide the magnetic force for attaching alignment tool 100 to shaft housing 8.

When adjustable arms 2 are properly adjusted according to the diameter of bore 24, roller assembly 3 abuts front surface 23 of shaft housing 8, while roller assembly 12 abuts bore 24. Alignment tool 100 may be rotated by rolling roller assemblies 3 and 12 on front surface 23 and bore surface 24.

Referring to FIG. 3, alignment tool 100 further includes one or more mounting elements, such as rods 6, inserted in respective grooves 22 on the front side of center hub 1 and secured by bolts 7. Bolts 7 are tightened into respective screw holes formed on the front side of center hub 1. The screw holes are proximate to groove 22 so that a portion of the bolt head of bolt 7 (or a washer associated therewith) clamps rod 6 against groove 22 to fix the position of rod 6 when bolt 7 is fully tightened. An alignment meter 10, 11 may be mounted onto rod or rods 6 for conducting a shaft alignment. The alignment procedure will be described below.

As shown in FIG. 3, alignment tool 100 may include a self-adjustment mechanism for automatically adjusting the length of second end section 26 of adjustable arm 2 according to the diameter of bore 24. Specifically, the self-adjustment mechanism includes a spring 35 disposed between an end face of first end section 25 of adjustable arm 2 and center hub 1. More specifically, a hole 21 may be formed in the end face of first end section 25 of adjustable arm 2, while a hole 31 may be formed on an end face of groove 19. Holes 21 and 31 are aligned, thereby forming a cavity. Spring 35 is disposed within the cavity formed by holes 21 and 31 and is loaded when adjustable arm 2 slides into groove 19. When alignment tool 100 is mounted on shaft housing 8, spring 9 urges adjustable arm 2 outwards and away from center hub 1, thereby pressing roller assembly 12 against bore 24. Due to the self-adjustment mechanism, alignment tool 100 may automatically adapt to the diameter of bore 24 and does not require precise manual adjustments and measurements to match the dimension of alignment tool 100 to the diameter of bore 24.

The outward force generated by spring 35 attaches roller assembly 12 onto bore 24 and assists in preventing alignment tool 100 from being detached from shaft housing 8. In addition, the outward force generated by spring 35 provides friction between roller assembly 12 and bore 24 so as to assist in maintaining alignment tool 100 oriented during the alignment procedure. In addition, the spring force urges the roller assemblies 12 to closely follow the surface of bore 24. As a result, variations of the surface contours are reflected in the rotation of alignment tool 100 through roller assemblies 12.

The self-adjustment mechanism described above may be implemented in each adjustable arm 2 so that each adjustable arm 2 may automatically adjust the length of second end section 26 according to the diameter of bore 24. Alternatively, the self-adjustment mechanism may be implemented in less than all of the plurality of adjustable arms 2. As a result, only the selected one or more of adjustable arms 2 may be automatically adjusted. The other adjustable arms 2 may be manually adjusted and fixed in position by bolt 5 or in any other appropriate manner. It is also contemplated that one or more adjustable arms 2 may not be adjustable at all, but rather fixedly secured to center hub 1.

The number of adjustable arms 2 may be varied depending on specific applications. Although FIG. 3 shows three adjustable arms 2, one skilled in the art will recognize that the number of adjustable arms 2 may be greater or fewer than three. For example, alignment tool 100 may include two adjustable arms 2 extending from center hub 1 along opposite radial directions. Alternatively, alignment tool 100 may include four or more adjustable arms 2 having a similar configuration as that shown in FIGS. 2 and 3.

The magnetic force provided by above-described magnetic component 29 may further assist the positioning of alignment tool 100 during the alignment procedure. Because of the magnetic force provided by magnetic component 29, alignment tool 100 may be urged against shaft housing 8 when the rotational force is removed. In addition, the magnetic force urges the roller assemblies 3 and 12 to closely follow the surface contours of front face 23 and bore 24. As a result, variations of the surface contours are reflected in the rotation of alignment tool 100 through roller assemblies 3 and 12.

Figure 4:
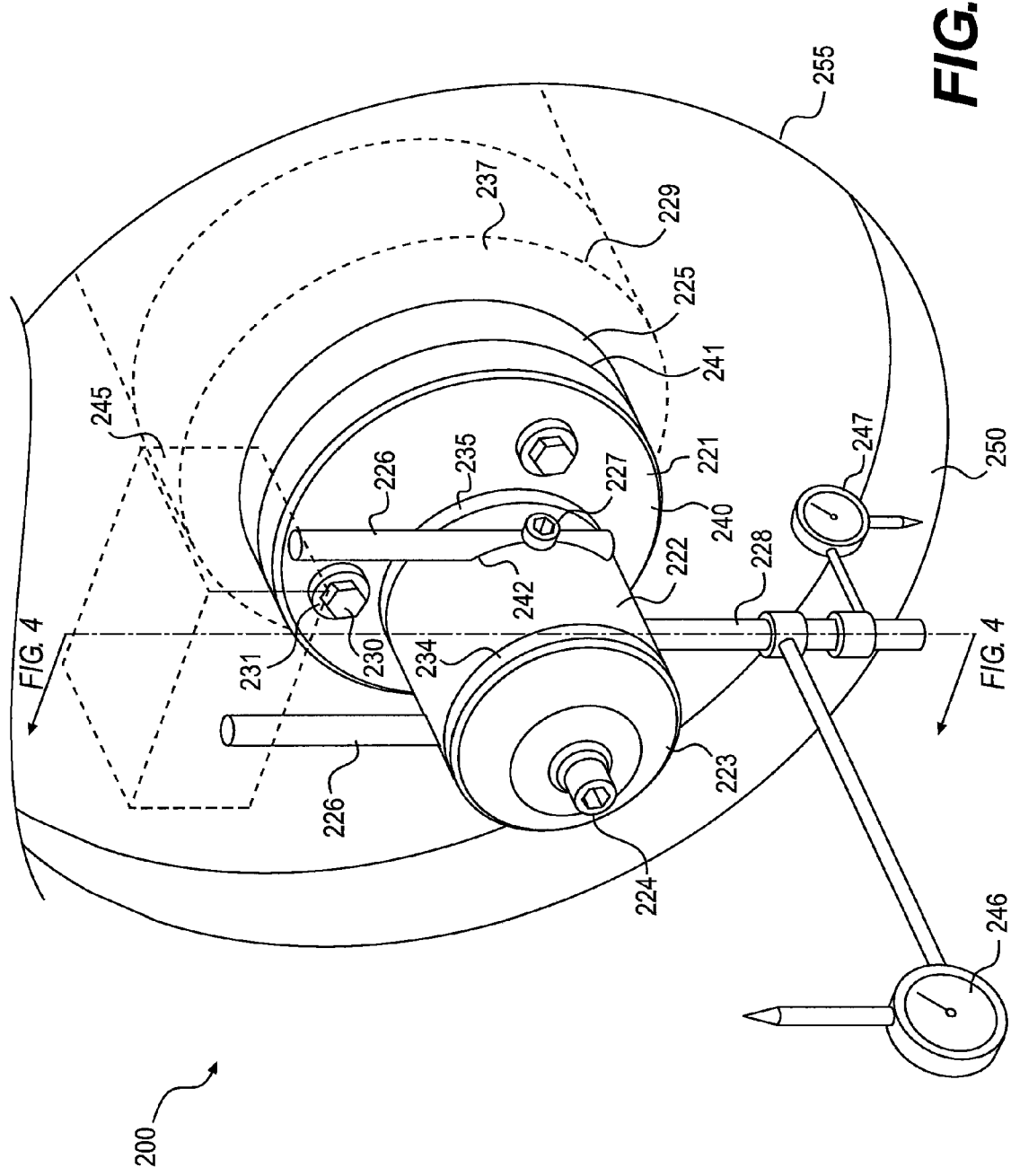
FIG. 4 is a perspective view of another exemplary shaft alignment tool.
Figure 5:
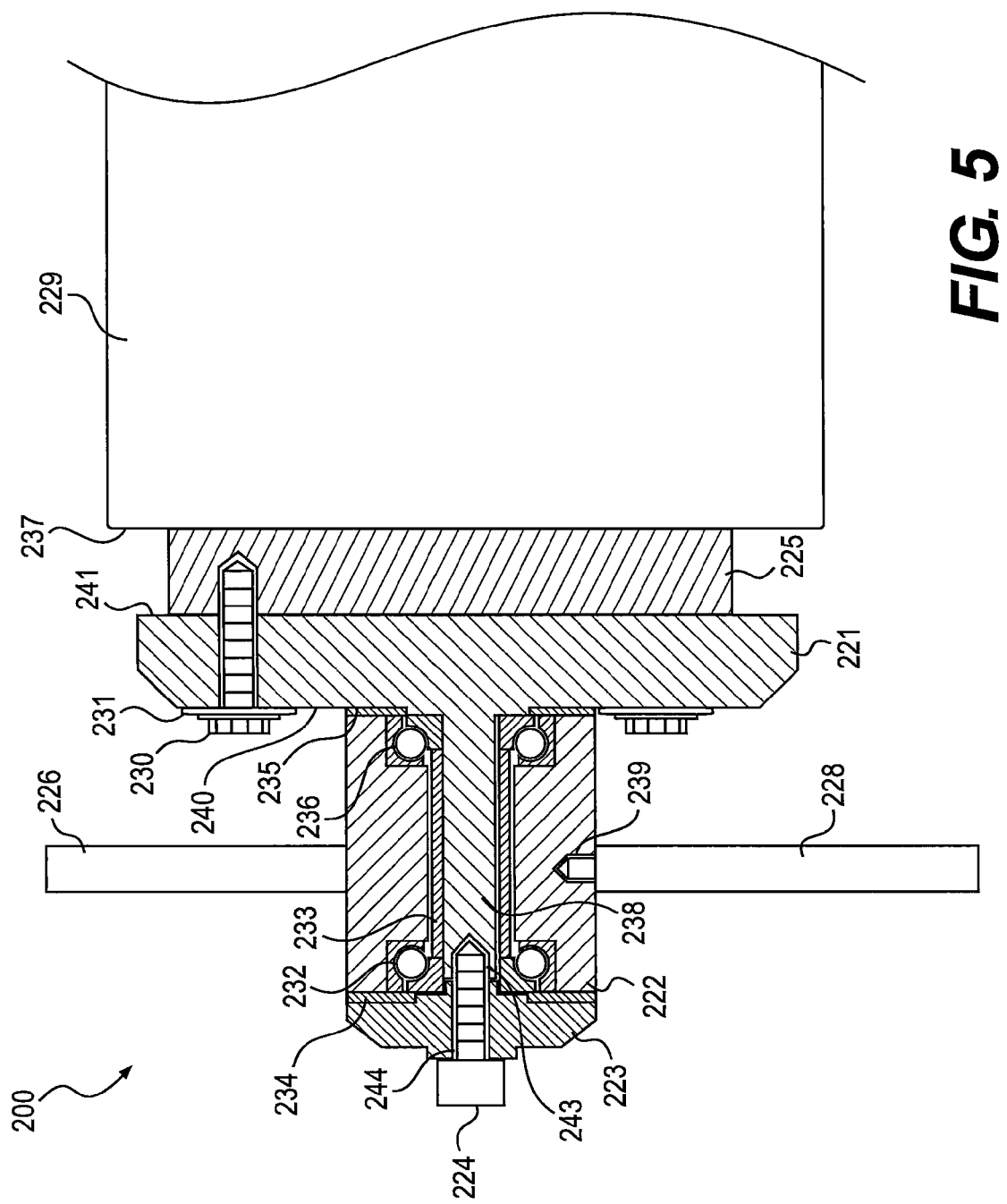
FIG. 5 is a cross-sectional view of the alignment tool of FIG. 4.

FIGS. 4 and 5 illustrate another shaft alignment tool 200 for aligning shafts 102 and 104 of FIG. 1. Depending on whether shaft connectors 112 and 116 are installed on shafts 102 and 104, alignment tool 200 may be attached to an end face of the shaft or the shaft connector shown in FIG. 1. For example, alignment tool 200 may be mounted to an end face of shaft 102 or 104 and used to align shafts 102 and 104 before shaft connectors 112 and 116 are installed. Alternatively, alignment tool 200 may be mounted to an end face of shaft connector 112 or 116 and used to align shafts 102 and 104 after shaft connectors 112 and 116 are installed. Thus, shaft 229 depicted in FIGS. 4 and 5 may be any rotating part or component mounted thereon that need to be axially aligned.

Alignment tool 200 includes a base 221, a center hub or a rotational body 222, and a front cover 223. Base 221 includes a front side 240 and a back side 241. When alignment tool 200 is mounted onto shaft 229, front side 240 faces away from shaft 229, while back side 241 faces towards shaft 229. Base 221 further includes a shaft 238 formed at substantially the center of front side 240 and protruding axially therefrom.

Rotational body 222 is mounted onto shaft 238 through bearings 232 and 236. Bearings 232 and 236 may be ball or roller bearings or any other appropriate bearings. A spacer 233 is disposed between bearings 232 and 236 to secure an axial distance between bearings 232 and 236.

Front cover 223 is mounted to an end face of shaft 238 by a bolt 224. Front cover 223 has a hole 244 for passing through bolt 224. The end face of shaft 238 has a screw hole formed thereon for receiving bolt 224. When bolt 224 is fully tightened, front cover 223 clamps bearings 232 and 236 and spacer 233 against base 221.

Alignment tool 200 further includes a ring 234 disposed between front cover 223 and rotational body 222 and a ring 235 disposed between rotational body 222 and base 221. Rings 234 and 235 may be made of rubber or other flexible or elastic material. When bolt 224 is tightened, rings 234 and 235 are slightly compressed in the axial direction. Rings 234 and 235 are configured to provide a proper amount of friction between respective components so that rotational body 222 can be manually rotated and remain in position when the rotation force is stopped.

Alignment tool 200 further includes an attaching mechanism 225 mounted onto back side 241 of base 221 via bolts 230 and washers 231. Attaching mechanism 225 may be a magnetic component, which includes the magnetic material described above and provides a magnetic force to secure alignment tool 222 onto end face 237 of shaft 229. Attaching mechanism 225 may have a disc shape, or any other appropriate shape. According to one embodiment, Attaching mechanism 225 may have a plurality of magnetic pieces. For example, each magnetic piece may have a disc shape and be disposed between the back side of base 221 and end face 237. According to an alternative embodiment, attaching mechanism 225 and base 221 may be formed as one piece. Accordingly, a portion of base 221 or entire base 221 may be magnetized, and bolts 230 and washers 231 may be omitted. Still alternatively, attaching mechanism 225 may include a suction device, which provides a suction or vacuum force for attaching alignment tool 200 to end face 237. One skilled in the art will appreciate that other attaching mechanisms may also be used to attach alignment tool 200 to end face 237 of shaft 229.

Alignment tool 200 further includes one or more mounting elements, such as rods 226 and 228. Rods 226 are inserted into respective grooves 242 made on an exterior surface of rotational body 222, and secured to rotational body 222 by bolts 227 tightened into a screw hole formed in rotational body 222. The screw hole for receiving bolt 227 is formed proximate to groove 242 so that a portion of bolt head of bolt 227 (or an associated washer) clamps rod 226 in a fixed location when bolt 227 is tightened. Rod 228 may be mounted onto rotational body 221 through a screw hole 239 formed on the exterior surface of rotational body 222. Rod 228 has a threaded end portion which is received by screw hole 239.

An alignment meter 245 may be mounted onto rods 226 or 228 for conducting a shaft alignment between shaft 229 and an opposite shaft. Alternatively or additionally, a dial gauge 246 may be mounted onto rods 226 or rod 228 for aligning shaft 229 with the opposite shaft. Further, rods 226 and 228 may be used to rotate rotational body 222 during the alignment procedure.

During an alignment procedure, alignment tool 200 is first aligned with shaft 229 through, for example, a dial gauge 247 depicted in FIG. 4. Because of the alignment between alignment tool 200 and shaft 229, rotation of rotational body 221 is substantially equivalent to rotation of shaft 229 itself with respect to variations of shaft position and orientation. As a result, the rotation of rotational body 221 simulates the rotation of shaft 229 when the alignment procedure is carried out. Thus, the rotation of shaft 229 is not needed during a shaft-to-shaft alignment procedure.

Industrial Applicability

Alignment tools 100 and 200 described above may be used to perform an axial alignment between two shafts in a variety of industrial or mechanical systems. For example, alignment tools 100 and 200 may be used in a turbine system to align an output shaft 104 of a turbine engine and an input shaft 102 of a gear box as shown in FIG. 1. Further, alignment tools 100 and 200 may be used to align an output shaft of any type of power system and a component to be driven by the power system. Even further, the alignment tools 100 and 200 can be used to align any two shafts that are intended to rotate together.

Figure 6:
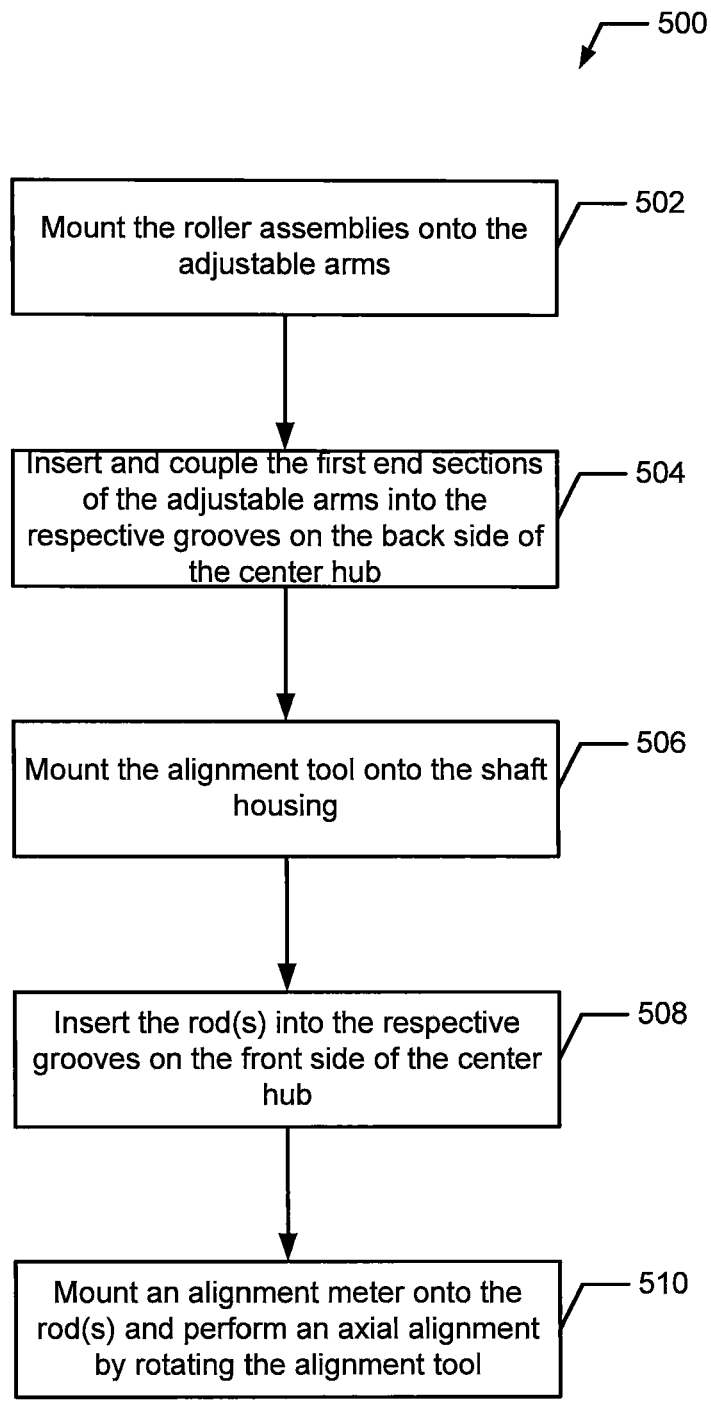
FIG. 6 is a flow diagram of an exemplary alignment procedure using the alignment tool of FIGS. 2 and 3.

FIG. 6 illustrates a process 500 of axial alignment using alignment tool 100 of FIGS. 2 and 3. According to process 500, at step 502, each adjustable arm 2 is assembled by mounting roller assemblies 3 and 12 on the second end section of adjustable arm 2.

At step 504, first end sections 25 of adjustable arms 2 are inserted into respective grooves 19 on the back side of center hub 1. The adjustable arms 2 are then coupled to the center hub 1 by bolts 5 extending through slots 18. If the self-adjustment mechanism is provided for adjustable arm 2, spring 35 is disposed into hole 31 of center hub 1 before the adjustable arm 2 is inserted.

At step 506, alignment tool 100 is mounted onto shaft housing 8. Specifically, center hub 1 is first positioned at the center of bore 24. It is not required to position center hub 1 in alignment with shaft 9. Adjustable arms 2 are urged inwards or outwards along respective grooves 19 to adjust the length of second end section 26, so as to place roller assemblies 3 and 12 on front surface 23 and bore 24, respectively.

The length of second end section 26 of each adjustable arm 2 may be adjusted in a number of manners. According to one embodiment, for example, if the self-adjustment mechanism described above is incorporated in every adjustable arm 2, the adjustable arms 2 may be adjusted by allowing spring 35 to urge adjustable arms 2 and press roller assemblies 12 onto bore 24. As a result, minimum manual adjustments are required to properly position adjustable arms 2.

According to another embodiment, if the self-adjustment mechanism is incorporated in less than all of the adjustable arms 2, adjustable arm or arms 2 without the self-adjustment mechanism are manually adjusted so as to press roller assemblies 3 and 12 onto front surface 23 and bore 24. Bolts 5 corresponding to these adjustable arms 2 are then tightened to fix the respective adjustable arms to center hub 1. Thereafter, the adjustable arm or arms 2 having the self-adjustment mechanism incorporated therein are adjusted so as to allow spring 35 to push respective adjustable arm 2 outwards and press roller assembly 12 on bore 24.

According to still another embodiment, none of adjustable arms 2 has the self-adjustment mechanism. As a result, the length of second end section 26 of each adjustable arm 2 is manually adjustable so as to press the roller assemblies 3 and 12 onto front surface 23 and bore 24, respectively. Thereafter, bolts 5 corresponding to each adjustable arm 2 is tightened to fix the adjustable arm 2 to center hub 2.

After all of the adjustable arms 2 are properly adjusted as described above, alignment tool 100 is mounted and attached to shaft housing 8 through the radial force provided by the self-adjustment mechanism or manual adjustment described above. When magnetic components 29 are provided at the end of adjustable arms 2, the magnetic components 29 provide magnetic forces to assist the mounting of alignment tool 100 onto shaft housing 8.

At step 508, rod or rods 6 are inserted into respective groove or grooves 22 of center hub 1. Bolt 7 is tightened to secure respective rod 6 within groove 22.

At step 510, an alignment meter, such as a laser transmitter 10 and/or a dial gauge 11, is mounted onto rod or rods 6, and an radial alignment procedure is carried out to align shaft 9 with opposite shaft 13 (FIG. 2). For example, the laser transmitter 10 may transmit laser signals to a laser receiver mounted on opposite shaft 13, or a laser receiver may be coupled to rod or rods 6 to receive laser signals from a laser transmitter mounted on opposite shaft 13. Alignment tool 100 carrying laser transmitter 10 is rotated either clockwise or counter clockwise by, for example, 180 degrees with a 5-degree increment for each step. Alignment data are collected through the laser signals provided by laser transmitter 10 at each step. Based on the alignment data, the relative position between shaft 9 and opposite shaft 13 may be adjusted as necessary.

Additionally or alternatively, a dial gauge 11 may be mounted on rod 6 via an extension arm 30. A tip of dial gauge 11 may be placed on various parts associated with opposite shaft 13, such as the shaft itself or a housing that is aligned with the shaft. The relative position between shaft 9 and opposite shaft 13 may be measured by rotating alignment tool 100 with dial gauge 11 mounted thereon. Dial gauge 11 provides measurements for determining the relative position between the shafts. Alignment tool 100 may be rotated either clockwise or counter clockwise by, for example, 180 degrees with a 5-degree increment for each step. Alignment data are collected from dial gauge 11 at each step. Based on the alignment data, the relative position between shaft 9 and opposite shaft 13 may be adjusted as necessary.

The steps of process 500 described above may be performed in a different order. For example, the step 504 may be performed before step 502. And similarly, step 508 may be performed before step 502 or 504. Other orders of the steps will be recognized by one skilled in the art upon reading this disclosure.

Alignment tool 100 provides easy mounting and dismounting of alignment tool 100 by way of the adjustable arms 2 and magnetic components 29. No bolts or screws are needed to secure alignment tool 100 onto shaft housing 8. Alignment tool 100 may be used on a machine housing cutout, such as the bore on a shaft housing 8 for a gear box, depicted in FIG. 2. Alternatively, alignment tool 100 may be mounted across any opening of a structure where a conventional tool is difficult to mounted to a center of the opening.

Alignment tool 100 may be easily rotated as necessary along the side wall of bore 24 by roller assemblies 3 and 12 on the respective surfaces. The self-adjustment mechanism and the magnetic forces provided by the magnetic components allows alignment tool 100 to be secured to shaft housing 8, while allowing rotational movement of alignment tool 100.

In addition, the self-adjustment mechanism of the arm or arms 2 apply a continuous radial force onto each adjustable arm 2. The radial force provided by loaded spring 9 automatically adjusts the length of second end section 26 of each adjustable arm 2 and allows roller assemblies 3 and 12 to trace the variations of front surface 23 and bore 24. As a result, the rotational movement of alignment tool 100 reflects the position of shaft housing 8 and hence shaft 9.

Furthermore, alignment tool 100 allows for alignment of mechanical systems, in which shaft 9 is recessed within bore 24. Because of the limited space within bore 24, it is difficult to mount conventional alignment tools onto the end face of shaft 9 and rotate bulky alignment meters within bore 24. Alignment tool 100, on the other hand, allows shaft 9 to be aligned with the opposite shaft through housing 8. In particular, shaft 9 and housing 8 are pre-aligned during assembly. As a result, aligning housing 8 with opposite shaft 13 also ensures alignment between shafts 9 and 13.

Further, the alignment meter can provide measurements of the relative position between shafts 9 and 13 regardless of the location of center hub 1 with respect to shaft 9. This is achieved because adjustable arms 2 support center hub 1 and maintain a fixed relative position between bore 24 and center hub 1. When alignment tool 100 is rotated, center hub 1 and the alignment meter 10 or 11 mounted thereon trace a circular trajectory that is substantially co-centered with bore 24 and shaft 9. As a result, rotating alignment tool 100 is substantially equivalent to rotating shaft 9 itself, regardless of the location of center hub 1. In addition, because the rotation of alignment tool 100 substantially replicates the rotation of shaft 9, the physical rotation of shaft 9 is not needed for the alignment between shaft 9 and opposite shaft 13.

Figure 7:
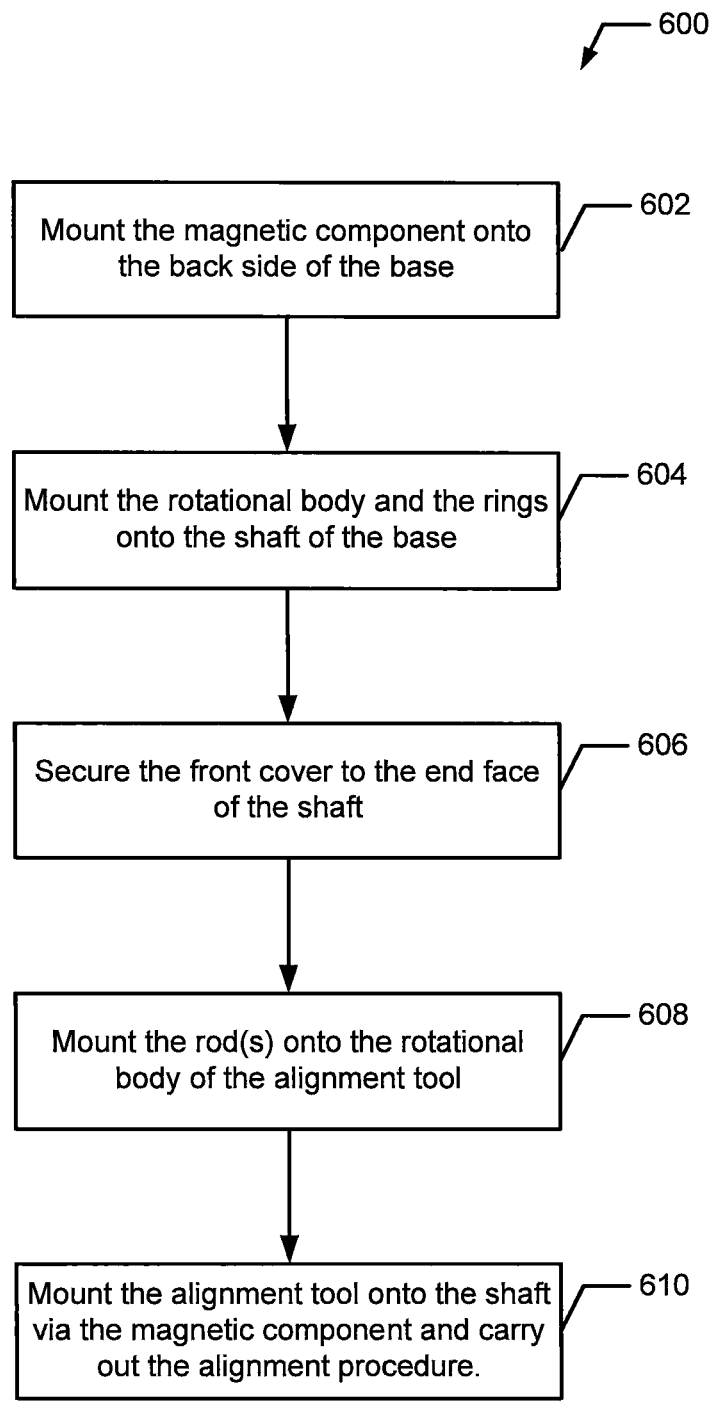
FIG. 7 is a flow diagram of another exemplary alignment procedure using the alignment tool of FIGS. 4 and 5.

FIG. 7 illustrates a process 600 of axial alignment using alignment tool 200 of FIGS. 4 and 5, according to one embodiment. According to process 600, at step 602, magnetic component 225 is mounted onto the back side of base 221 via bolts 230 and washers 231.

At step 604, rotational body 222 and rings 234 and 235 are mounted onto shaft 238 of base 221 via bearings 232 and 236. Specifically, ring 235 and bearing 236 are first mounted onto shaft 238, and spacer 233 is slid onto shaft 238 in front of bearing 236. Rotational body 222 is slid onto bearing 236 and spacer 233. Bearing 232 is then mounted onto shaft 238 and disposed within a bearing housing on rotational body 222. Ring 234 is placed on the end face of rotational body 222.

At step 606, front cover 223 is mounted onto the end face of shaft 238 via bolt 224. Bolt 224 is tightened to secure front cover 223 onto shaft 238, while allowing rotational body 222 to be rotatable between front cover 223 and base 221.

At step 608, rods 226 and 228 are mounted onto rotational body 222. Specifically, rods 226 are inserted into respective grooves 242. Bolts 227 are tightened to secure rods 226 within grooves 242. Rod 228 is mounted onto rotational body 222 by tightening the threaded section of rod 228 into screw hole 239.

At step 610, assembled alignment tool 200 is mounted onto shaft 229 and an axial alignment is carried out to align shaft 229 and an opposite shaft (not shown). Alignment tool 200 is mounted onto shaft 229 through attaching mechanism 225. In one embodiment, attaching mechanism 225 includes one or more magnetic components. Alignment tool 200 is mounted onto shaft 229 by bringing the magnetic component into contact with end face 237 of shaft 229. The magnetic force provided by the magnetic component attaches alignment tool 200 onto shaft 229. Alternatively, when attaching mechanism 225 includes a suction device, alignment tool 200 is mounted onto shaft 229 by pressing the suction device onto end face 237. The suction force provided by the suction device secures alignment tool 200 onto end face 237.

After alignment tool 200 is secured, a radial alignment between alignment tool 200 and shaft 229 is first conducted through dial gauge 247. As shown in FIG. 4, for example, dial gauge 247 is mounted on rod 228, while a tip of dial gauge 247 is placed on the bore 250 of shaft housing 255. Rotational body 222 carrying dial gauge 247 is rotated to measure the relative radial position between alignment tool 200 and the shaft 255 bore. Based on the measurement provided by dial gauge 247, alignment tool 200 is adjusted so that it is aligned with the bore and hence shaft 229. Alternatively, the tip of dial gauge 247 is placed onto the shaft body of shaft 229 itself. A similar radial alignment is carried out to aligned alignment tool 200 with shaft 229.

Furthermore, an alignment meter, such as a laser transmitter 245 or a dial gauge 246 described above, is mounted onto rods 226 and/or 228 for aligning shaft 229 with the opposite shaft. The alignment procedure is similar to that describe above in connection with FIG. 6. During the alignment between shaft 229 and the opposite shaft, readings provided by dial gauge 247 are monitored to ensure that alignment tool 200 remained aligned with shaft 229.

The steps of process 600 described above may also be performed in a different order. For example, step 608 may be performed before steps 602 and/or 604. And similarly, base 221 including attaching mechanism 225 may be first mounted onto shaft 229 before other components are assembled. Other orders for performing process 600 will be recognized by one skilled in the art upon reading this disclosure.

Alignment tool 200 may provide similar advantages as those of alignment tool 100 described above. Specifically, attaching mechanism 225 provides easy mounting and dismounting of alignment tool 200 onto front face 237 of shaft 229 or any surfaces that require radial alignments.

Alignment tool 200 is particularly suitable for aligning shafts that protrude beyond the shaft housing. By rotating body 222, which carries the alignment meter, rotation of the shaft itself is not needed during the alignment procedure. As a result, alignment tool 200, similar to alignment tool 100, saves time and effort and prevents the shaft from damage during the alignment. Furthermore, when dial gauge 247 is placed on the bore to align alignment tool 200 with shaft 229, a pre-alignment between shaft 229 and the bore is preferred. Alternatively, if dial gauge 247 is placed on shaft 229 itself to align alignment tool 200 with shaft 229, a pre-alignment between shaft 229 and the bore is not needed.

According to another embodiment, alignment tools 100 and 200 may be used together or separately. For example, alignment tool 100 may be mounted onto gearbox housing 126, while alignment tool 200 may be mounted onto output shaft 104. As a result, shafts 102 and 104 may be aligned by aligning shaft 104 with gearbox housing 126. Alternatively, alignment tool 100 may be mounted onto the opening of coupling hub 114, while alignment tool 200 may be mounted onto output shaft 104 of the turbine engine. Thus, shafts 102 and 104 may be aligned through the alignment between shaft 104 and coupling hub 114. Still alternatively, two alignment tools 100 may be mounted onto the bores of gearbox housing 126 and engine housing 128, respectively, so that shafts 102 and 104 may be aligned through the alignment between gearbox housing 126 and engine housing 128. Still alternatively, two alignment tools 200 may be respectively mounted on shafts 102 and 104 or shaft connectors 112 and 116, so that shafts 102 and 104 may be aligned by simulating their respective rotations through alignment tools 200.

Still alternatively, alignment tools 100 and 200 may be used in conjunction with conventional alignment tools for aligning shafts 102 and 104. For example, alignment tool 100 may be mounted onto the bore of gearbox housing 126 or the opening of coupling hub 114, while a conventional alignment tool may be mounted to shaft 104 or engine housing 128. An axial alignment procedure may be carried out by rotating alignment tool 100 to trace the bore of gearbox housing 126 or the opening of coupling hub 114. Alternatively, alignment tool 200 may be mounted onto shaft 102 or shaft connector 112, while a conventional alignment tool may be mounted to shaft 104 or engine housing 128. Similarly, an axial alignment procedure may be carried out by rotating alignment tool 200 to simulate the rotation of shaft 102. One skilled in the art will appreciate that other variations and combinations of alignment tools 100 and 200 may be implemented upon reading the disclosure.

It will be apparent to those skilled in the art that various modifications and variations can be made to the disclosed shaft alignment tools. Other embodiments will be apparent to those skilled in the art from consideration of the specification and practice of the disclosed shaft alignment tools. It is intended that the specification and examples be considered as exemplary only, with a true scope being indicated by the following claims and their equivalents.

What is claimed is:

1. A shaft alignment tool comprising:
    a base including a shaft attaching mechanism for attaching the shaft alignment tool to an end surface of a first shaft to be aligned with a second shaft, the base further including a base shaft protruding axially from the base;
    a rotational body mounted on the base shaft of the base through one or more bearings for relative rotation with respect to the base, wherein the rotational body is aligned co-axially with the first shaft; and
    an alignment meter coupled to the rotational body for providing alignment measurements between the first shaft and the second shaft.

2. The shaft alignment tool of claim 1, wherein the base includes a front side facing away from the end surface of the first shaft and a back side facing toward the end surface of the first shaft.

3. The shaft alignment tool of claim 2, wherein the base shaft is disposed at a center of the front side of the base.

4. The shaft alignment tool of claim 1, wherein the shaft attaching mechanism is disposed on the back side of the base.

5. The shaft alignment tool of claim 1, wherein the one or more bearings include a first bearing and a second bearing mounted on the base shaft, and the shaft alignment tool further includes a spacer mounted on the base shaft and between the first bearing and the second bearing for securing an axial distance between the first bearing and the second bearing.

6. The shaft alignment tool of claim 1, wherein the shaft attaching mechanism includes a magnet or suction device configured to couple the shaft alignment tool to a shaft.

7. The shaft alignment tool of claim 1, wherein the alignment meter includes at least one of a laser transmitter, laser receiver, or a dial gauge.

8. The shaft alignment tool of claim 7, wherein the alignment meter is coupled to the rotational body through at least one rod that extends radially from the rotational body.

9. A method of aligning a first shaft and a second shaft, the method comprising:
- coupling a shaft alignment tool to an end surface of the first shaft, wherein the alignment tool includes a base attached to the end surface of the first shaft through a shaft attaching mechanism, and a rotational body mounted on a base shaft protruding axially from the base through one or more bearings;
- aligning, co-axially, the rotational body of the shaft alignment tool with the first shaft;
- rotating the rotational body; and
- performing the radial alignment between the first shaft and a second shaft based on the rotating of the rotational body and using an alignment meter coupled to the rotational body.

10. The method of aligning of claim 9, wherein the performing of the radial alignment includes rotating one of a laser transmitter, laser receiver, or dial gage with the rotating of the rotational body.

11. The method of aligning of claim 9, further including coupling the alignment tool to the first shaft by one of a magnet or a suction device.

12. The method of aligning of claim 9, wherein the aligning of the rotational body of the shaft alignment tool with respect to the first shaft includes aligning the rotational body of the shaft alignment tool with respect to a housing bore aligned with the first shaft.

13. The method of aligning of claim 9, further including maintaining the first shaft stationary during the rotating of the rotational body.

14. The method of aligning of claim 9, wherein the alignment tool further includes a front cover mounted to an end of the base shaft for securing the rotational body to the base shaft, and
the method further includes adjusting the front cover to adjust friction applied to the rotational body.

15. The method of aligning of claim 9, further including:
rotating the rotational body with the alignment meter at incremental steps within a predetermined range of angle;
recording alignment data at each incremental step; and
positioning the first shaft and the second shaft with respect to each other based on the alignment data.

16. A shaft alignment tool comprising:
- a base having a base shaft extending normal with respect to a front side of the base, the base including a shaft attaching mechanism for attaching the shaft alignment tool to an end surface of a first shaft to be aligned with a second shaft;
- a rotational body mounted on the base shaft through one or more bearings for relative rotation with respect to the base, wherein the rotational body is aligned co-axially with the first shaft;
- at least one arm extending radially from the rotational body; and
- an alignment meter coupled to the at least one arm for providing alignment measurements between the first shaft and the second shaft.

17. The shaft alignment tool of claim 16, wherein the one or more bearings include a first bearing and a second bearing mounted on the base shaft, and the shaft alignment tool further includes a spacer mounted on the base shaft and between the first bearing and the second bearing for securing an axial distance between the first bearing and the second bearing.

18. The shaft alignment tool of claim 16, further including a magnet or suction device configured to couple the shaft alignment tool to the end surface of the first shaft.

19. The shaft alignment tool of claim 16, wherein the alignment meter includes at least one of a laser transmitter, laser receiver, or a dial gauge.

20. The shaft alignment tool of claim 16, further including a front cover located at an end of the base shaft opposite the front side of the base.

* * * * *

UNITED STATES PATENT AND TRADEMARK OFFICE
CERTIFICATE OF CORRECTION

PATENT NO. : 8,997,365 B2  
APPLICATION NO. : 13/494610  
DATED : April 7, 2015  
INVENTOR(S) : Alexander et al.

Page 1 of 1

It is certified that error appears in the above-identified patent and that said Letters Patent is hereby corrected as shown below:

IN THE SPECIFICATION

Column 6, line 34, delete "Industrial Applicability" and insert -- INDUSTRIAL APPLICABILITY --.

Signed and Sealed this  
First Day of March, 2016

Michelle K. Lee  
*Director of the United States Patent and Trademark Office*